United States Patent [19]
Schiler

[11] 3,785,056
[45] Jan. 15, 1974

[54] STATICALLY BALANCED PROBE ASSEMBLY
[75] Inventor: Frederick S. Schiler, Stow, Ohio
[73] Assignee: Portage Machine Company, Akron, Ohio
[22] Filed: Mar. 26, 1971
[21] Appl. No.: 128,367

[52] U.S. Cl. .............................. 33/169 R, 33/174 L
[51] Int. Cl. ............................................. G01b 5/20
[58] Field of Search ...................... 33/172 B, 169 R, 33/174 R, 174 L

[56] References Cited
UNITED STATES PATENTS
| 3,279,079 | 10/1966 | Schiler | 33/169 R |
|---|---|---|---|
| 3,069,778 | 12/1962 | Schiler | 33/174 R |
| 3,279,077 | 10/1966 | Schiler | 33/169 R |
| 3,501,840 | 3/1970 | Schiler | 33/169 R |
| 496,272 | 4/1893 | Miebach | 33/172 |
| 2,623,293 | 12/1952 | Nebesar | 33/199.5 E |

Primary Examiner—Stanley N. Gilreath
Assistant Examiner—Jon W. Henry
Attorney—Freeman & Taylor

[57] ABSTRACT

A probe unit for use with Layout and Inspection machines and like measuring apparatus with the improvement relating to the use of a pivoted mechanical linkage that results in a desired mechanical advantage to achieve increased sensitivity, and further relating to the use of counter-weights to statically balance the pivoted linkage components of the probe so as to permit usage in a vibratory environment without effecting the operation of the probe.

4 Claims, 6 Drawing Figures

INVENTOR.
FREDERICK S. SCHILER
BY Freeman & Taylor
ATTORNEYS

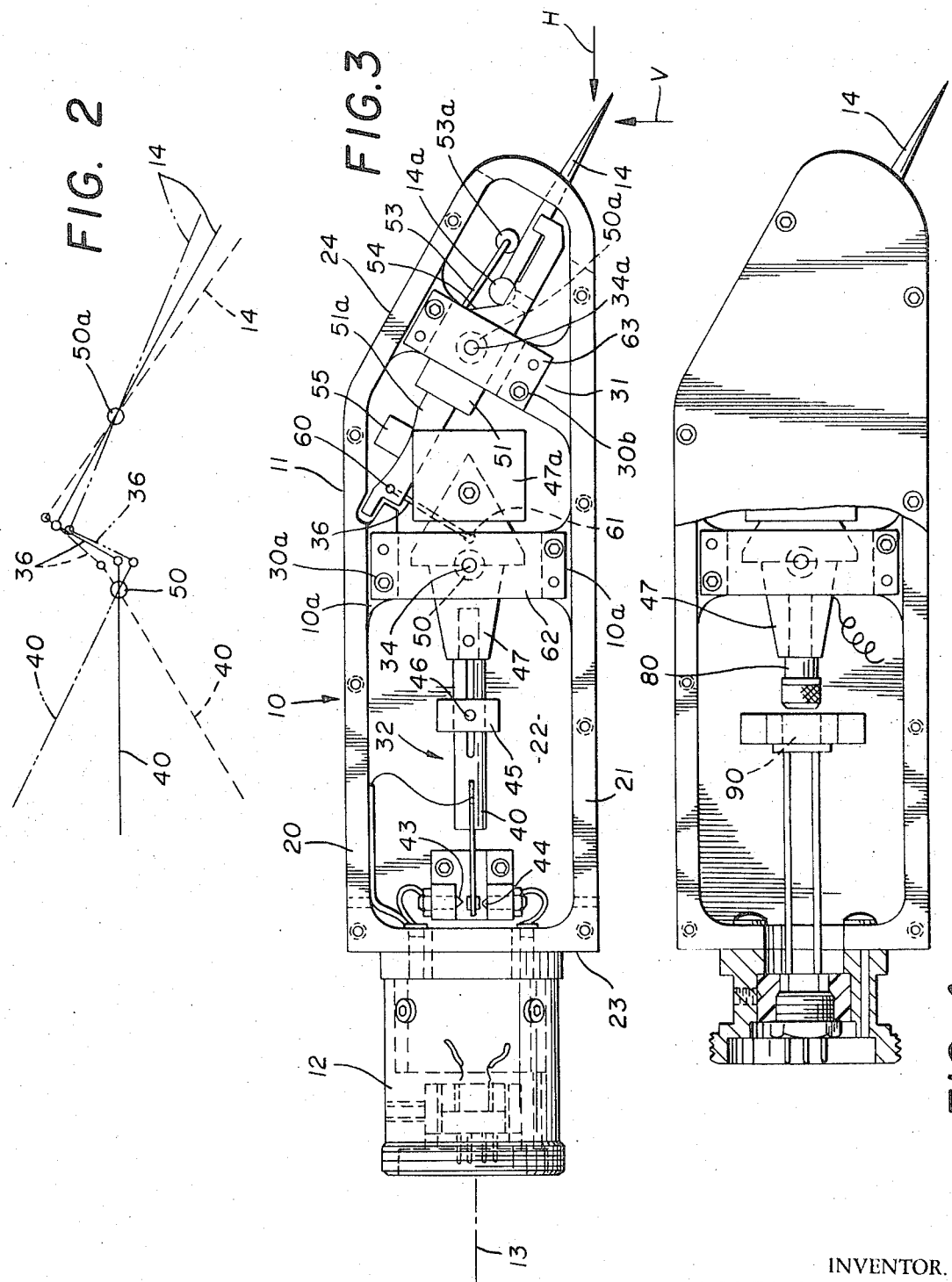

3,785,056

STATICALLY BALANCED PROBE ASSEMBLY

BACKGROUND OF THE INVENTION

Probes of varying types have long been known in the inspection industry, with probes acting as the feeler point of the inspection unit so as to in some manner indicate the location of a precise point on a machine part, for example. With the high degree of accuracy presently required, it is elemental that the probe be extremely sensitive and delicate, and often times the environment within which the probe is associated is not conducive to the best operation.

1. FIELD OF THE INVENTION

Probes of the type herein being discussed are extremely well adapted for use either on a Layout Machine of the type shown in Applicant's prior U.S. Pat. No. 3,069,778 or on an Inspection Machine of the type set forth in Applicant's U.S. Pat. No. 3,279,079.

Both such machines disclosed by the above patents are manufactured and sold by Portage Machine Company of Akron, Ohio. It is to be noted that use of these probes on such machinery is particularly advantageous because of the fact that these machines are intended to give three-dimensional measure-ments along the X, Y, and Z axes and, as will be hereinafter described, the improved probe which is the subject of this application will automatically give two-dimensional readings in any given operating mode.

2. DESCRIPTION OF THE PRIOR ART

Prior art on probes per se contains probes of all types, but to Applicant's knowledge there is no prior art that anticipates the concept of improving the probe operation by achieving a mechanical advantage wherein the probe sweep is minimal compared to the arm sweep that results from any probe movement, and further there is no known prior art that shows the use of counter-weights on pivoted linkage members to maintain the pivoted link members in a static or balanced condition so that the probe will be insensitive to vibrations occurring in its locale, with the result that false readings and the like will not occur during normal operation of the improved probe.

SUMMARY OF THE INVENTION

Production of a probe whose sensitivity is increased by using pivoted link members appropriately interconnected to give a large degree of movement to the contact arm upon relatively small amount of movement of the probe arm per se is one principal object of this invention.

A further principal object of the invention is to improve the operating characteristics of a probe by using appropriate counter-weights located so that the link members are always in a condition of static balance regardless of the probe position.

A still further object of this invention is to produce a probe that can be associated with inspection equipment so as to give readings on two axes at any given point during the operation thereof.

These and other objects of the invention will become more apparent upon a reading of the following brief specification, considered and interpreted in the light of the accompanying drawings.

OF THE DRAWINGS:

FIG. 2 is a line drawing illustrating the mechanical advantage achieved during movement of the probe.

FIG. 3 is a plan view taken with the cover removed and illustrating the component parts.

FIG. 4 is a view similar to FIG. 3 but illustrating the modified form of the invention wherein a different type of control arm mechanism is employed.

Figure 5:
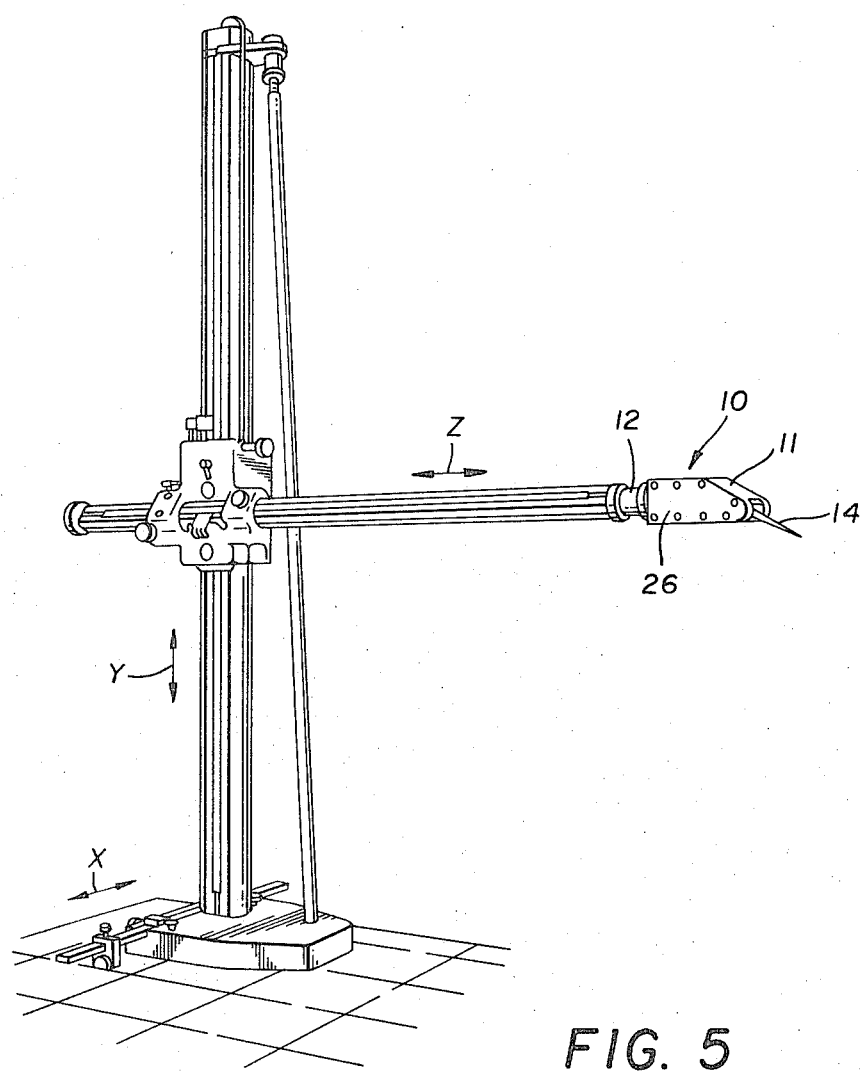
FIG. 5 is a schematic view showing the probe installed on a Portage Layout Machine.
Figure 6:
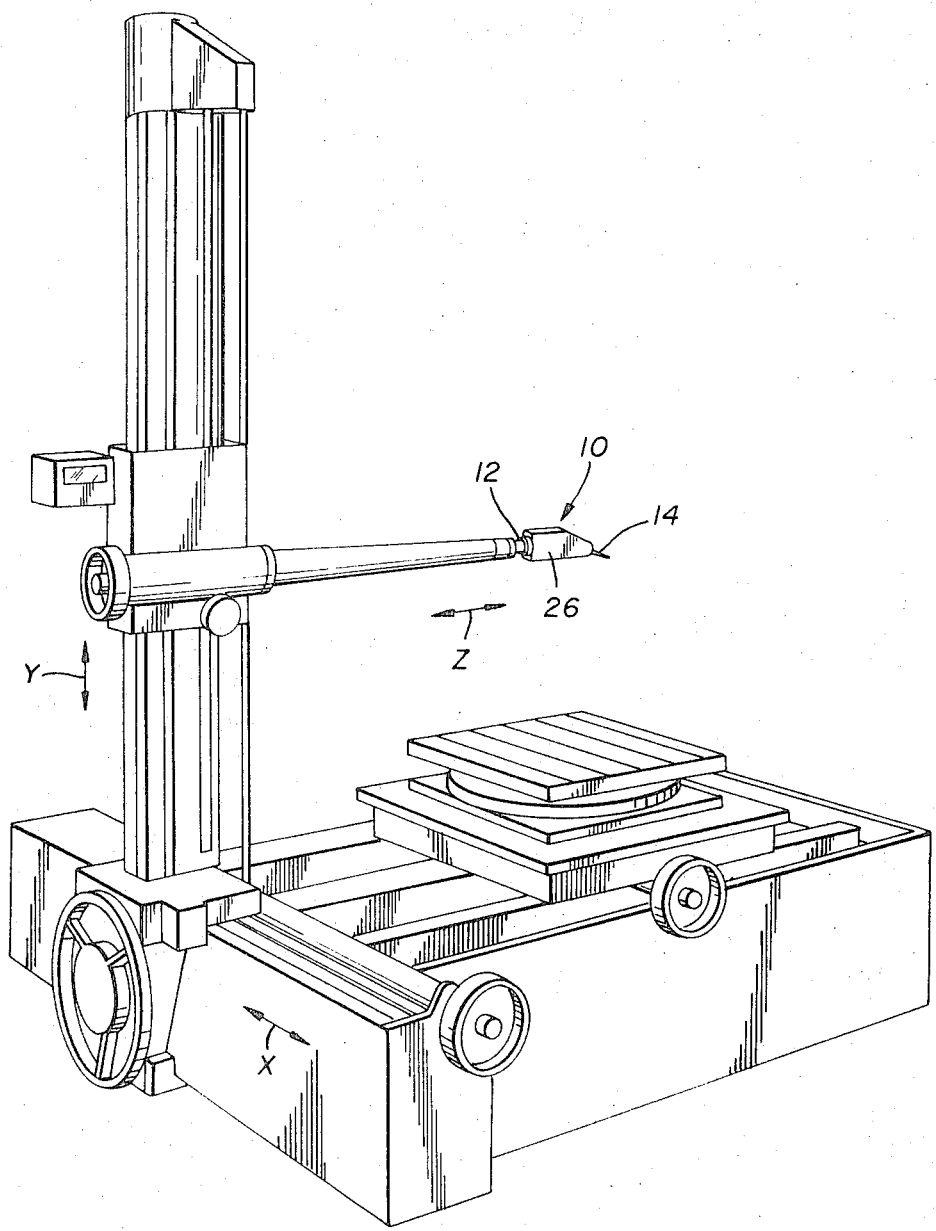
FIG. 6 is a schematic view showing the probe installed on a Portage Inspection Machine.

Referring now to the drawings, the improved probe assembly, generally designated by the numeral 10, includes a housing 11 and mounting adapter 12 that permits the unit 10 to be inserted, for example, on the end of the crossarm of a Portage Layout Machine as shown in FIG. 5, with the probe assembly 10 being mounted so that the unit 10 rotates around an axis of rotation 13 so that the probe portion 14 thereof can take dimensions along the X, Y, and Z axes, as will be described.

Figure 1:
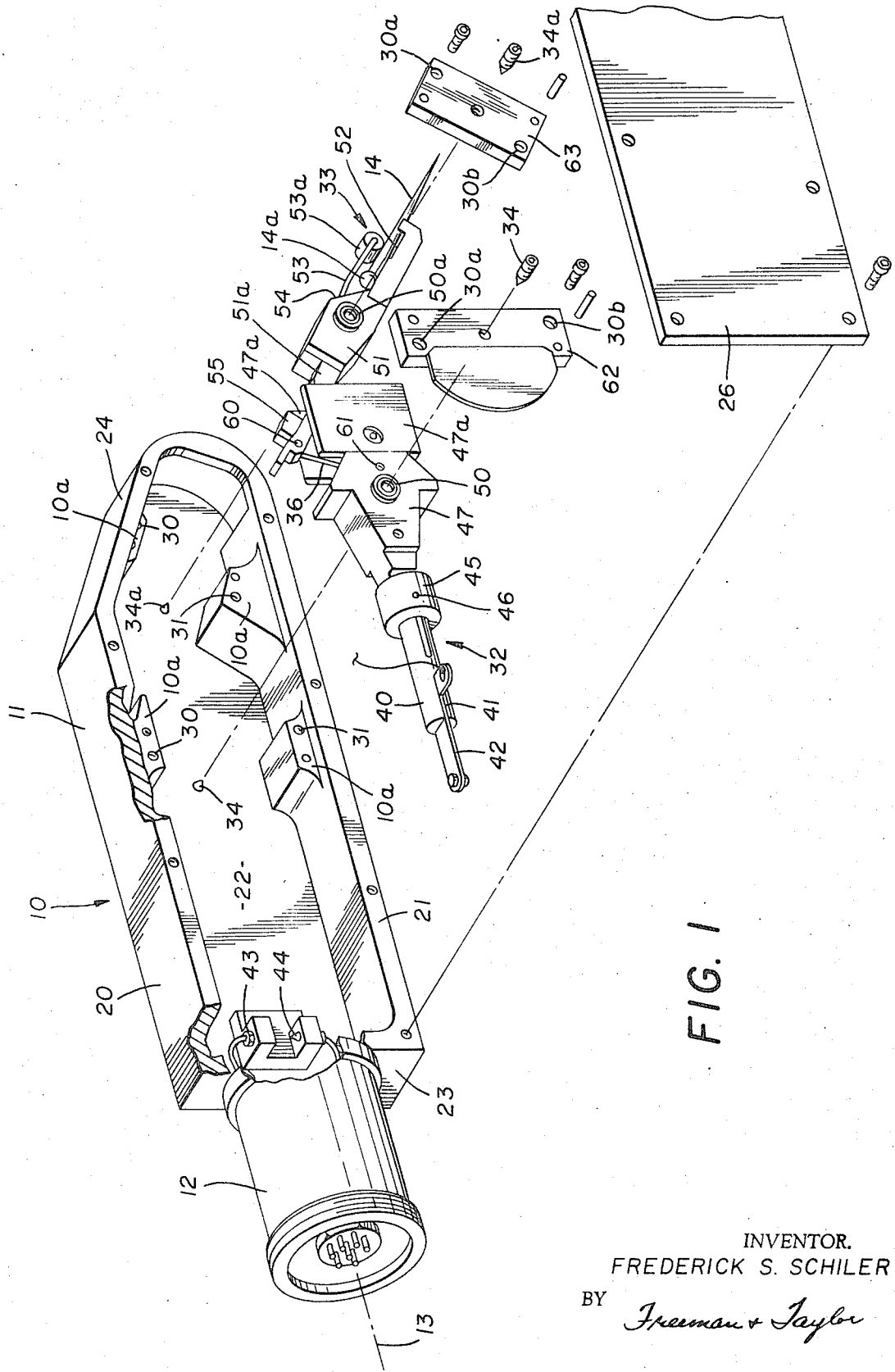
FIG. 1 is an exploded view schematically illustrating the main components of the improved probe.

The casing 11 as shown herein includes a top wall 20, a bottom wall 21, a back wall 22, an inboard end wall 23, and a forward probe wall surface 24, with an opening being defined between the probe wall 24 and the forward end of the lower wall 21, as clearly shown from FIG. 1 of the drawings. A cover 26 is fastened to the appropriate wall members by use of screw members in known fashion so as to enclose the housing and the components received therein during normal operation.

In addition to the aforementioned component parts, the back wall 22 of the housing 10 has provided therein threaded openings 30 and 31 with aligned openings 30a and 30b being provided in straps 62 and 63, with the straps being adapted to be secured to abuttment members 10a,10a that are integral with the housing 10, as is best shown in FIG. 1 of the drawings. By this arrangement pins 34,34 and 34a,34a having pointed ends can be respectively threaded into engagement with the opposed jewel bearings 50,50 of the contact arm assembly 32 and opposed jewel bearings 50a,50a of the probe arm assembly 33 to thus pivotally support these components with respect to the housing 10.

As will be subsequently described in greater detail, wire 36 interconnects the contact arm assembly 32 and the probe arm assembly 33 so that pivotal movement of one such component results in simultaneous pivotal movement of the remaining component.

Referring again to the drawings, the contact arm assembly 32 includes non-conductive contact arm 40 that has a slot 41 extending transversely at one end so as to receive a metallic contact element 42 (including a contact wire) that will move into contact with either contact 43 or 44 (See FIG. 4) upon pivoting of the probe member 14. A first counter-weight 45 surrounds the arm 40, as shown in FIGS. 1 and 3, with this arm being secured in place by screw 46. The arrangement is such here that it is preferable that the screw merely contact the arm so as to locate the counter-weight at any given longitudinal position on the arm.

A second counter-weight 47 is also shown surrounding the arm 40, and the arrangement of this counter-weight further includes additional counter-weight elements 47a,47a that are attached to the counter-weight 47 as shown in FIG. 1 of the drawings. An important feature of the invention is the provision of such first and second counter-weights, with the contact arm assembly 31 having a pivotal point (defined by jewel bearings 50,50) around which all pivotal action will occur. A specific object of the invention is to balance the contact arm so that it will not pivot around this point absent movement of the probe 14, and to this end the counter-weights are located in such a fashion that the force moment created by the weight to the left (FIG. 1) of the pivotal point 50 is exactly equal to the force moment created by the weight located to the right (FIG. 1) of the pivotal point 50. Thus, in effect, these moment forces cancel each other out with the result that an extremely stable probe component is produced.

Much the same structural arrangement has been utilized in constructing the probe arm assembly 33, which is best shown in FIGS. 1 and 3 of the drawings.

The probe arm assembly 33 includes a holder component 51 within which the probe 14 may be releasably received, with spring 53 having a roller 53a that overlies the probe 14 to retain the same normally within the confines of the pocket 52. In the event the probe encounters a force along its axial length, the rounded head 14a of the probe can slide up the inclined wall 54 to avoid damage. The body portion 51 preferably further includes a projecting arm 51a that receives a counter-weight 55 thereon, as clearly shown in FIGS. 1 and 2 of the drawings. In this regard the same principle of utiliz-ing equal force moments is employed, with the result that the force moment created by the portions to the left (FIG. 1) of pivotal point 50a are identical in amount to the force moment created by the weight described to the right (FIG. 1) of the pivotal point 50a.

It has been previously indicated that the wire 36 interconnects the contact arm assembly 32 and the probe arm assembly 33 in such a fashion that probe movement results in amplified movement of the member 42 due to the linkage arrange-ment shown in FIG. 2 of the drawings. Appropriate slots are provided in the counter-weight 47 and the forward portion of the arm 51d so that pins can be inserted in openings 60 and 61 to thus serve as a point of connection for the wire 36.

In use or operation of the improved probe assembly, it will first be assumed that the component parts have been assembled to the condition shown in FIG. 3.

At this time and referring to FIG. 3, if a force is received from the direction of arrow H, the probe will be moved downwardly so as to cause the end 51 to move upwardly. The wire 36 will cause similar lifting movement of the right hand portion of contact arm assembly 32, with the result that the contact 42 will engage contact element 44.

On the other hand, if a force in the direction of arrow V is encountered, the probe will move upwardly so that a reverse type of linkage move will be obtained resulting in the arm 42 striking the upper contact 43. Preferably the contacts 42, 43, and 44 for a "make" type of electrical connection so that when contact is made, the circuit is energized to print our data in known fashion that is indicative of the point where the probe arm is disposed with reference to the X, Y, and Z axes as the case may be.

With reference to such X, Y, and Z axes the arrow H, of course, would represent the force encountered in travel along what will be referred to herein as the Z axis, with such movement being representative of the in and out movement of the crossarm of the Portage Layout Machine aforesaid, shown in FIG. 5. The V force described above would be representative of the movement along the Y axis, which is the movement of the bracket up and down on the vertical column.

The remaining axis is the X axis, and this would represent movement of the base transversely of the surface table. Distance along this axis could be attained by indexing the probe assembly 90°.

Thus, by indexing of the probe 10 around its axis of rotation 13, measurements in all three X, Y, and Z axes can be taken.

The modified form of the invention, shown in FIG. 4, utilizes a similar linkage system to the one just-described in connection with FIGS. 1 through 3, with the only difference being that the contacting end of the contact probe assembly 32 is modified to include a light-emitting unit 80 that is mounted to project from the counter-weight 47 and replace the arm 40 of FIGS. 1 through 3. This unit 80 is of known manufacture and merely emits a beam of light towards a silicon photodetector, indicated by the numeral 90 of FIG. 4 of the drawings, The unit 90 replaces contacts 43 and 44 of FIGS. 1 and 3, and in essence is made up of one or more photo-electric cells that emit varying electrical charges depending upon the amount of light they respectively receive.

Thus, when the location of light received changes, the photo-electric cell will emit a different current which will electrically energize a signal to initiate means that instantaneously print out, for example, probe position along a given axis, with it being possible in a more sophisticated version to compensate for any probe movement that may have occured prior to print out.

Operation of the probe assembly shown in FIG. 4 is essentially the same as previously described in connection with FIGS. 1 through 3.

While a full and complete description of the invention has beeen set forth in accordance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

What is claimed is:

1. A probe assembly of the character described, comprising;
   A. a housing having
      1. an open probe-receiving end, and
      2. a closed contact end having at least one contact element provided therein;
   B. a contact arm assembly pivotally supported about a fixed pivot point interiorly of said housing and having a contact end adapted to move into and out of engagement with said contact element upon pivotal movement around said pivot point;
   C. a probe arm assembly pivotally mounted, about a fixed pivot point, to said housing in the probe receiving end thereof and having a probe portion projecting through said open end for contact with a work surface;
   D. a link member interconnecting the remaining end portions of said contact arm assembly and said probe arm assembly to define a linkage, with the connected ends of said linkage being disposed on the opposite side of the respective pivot points in opposed relationship to said contact end and said probe end, whereby movement of said probe tip results in movement of said contact end into and out of engagement with said contact element; and E. a counterweight provided on at least one said arm assembly and being adapted to statically balance said linkage for probe stabilizing purposes.

2. The device of claim 1 further characterized by the fact that two such contact elements are provided in said contact end portion of said housing; contact between one said contact elements and said contact end of said contact arm assembly indicating a dimension along one axis of movement; contact between the remaining said contact element and the contact end of said contact arm assembly indicating a dimension along an axis that is disposed at right angles to said first axis of movement.

3. The probe assembly of claim 1 further characterized by the fact that said contact arm assembly and said probe arm assembly are each subjected to identical force moments on opposed sides of their respective pivot points, whereby the same are statically balanced in normal operating use.

4. The device of claim 1 further characterized by the fact that the linkage connection is such that movement of the probe through a given distance results in movement of the contact end through a distance that is several-fold multiples of the distance traveled by said probe.

* * * * *